United States Patent [19]

Strubbe et al.

[11] Patent Number: 5,483,278
[45] Date of Patent: * Jan. 9, 1996

[54] SYSTEM AND METHOD FOR FINDING A MOVIE OF INTEREST IN A LARGE MOVIE DATABASE

[75] Inventors: Hugo J. Strubbe, Yorktown Heights; Ijsbrand J. Aalbersberg, Mt. Kisco, both of N.Y.

[73] Assignee: Philips Electronics North America Corporation, New York, N.Y.

[ * ] Notice: The portion of the term of this patent subsequent to Jun. 29, 2010, has been disclaimed.

[21] Appl. No.: 128,513

[22] Filed: Sep. 28, 1993

Related U.S. Application Data

[63] Continuation of Ser. No. 70,130, Jun. 1, 1993, which is a continuation-in-part of Ser. No. 889,201, May 27, 1992, Pat. No. 5,223,924.

[51] Int. Cl.⁶ ..................................................... H04N 7/10
[52] U.S. Cl. .................................. 348/7; 348/12; 455/5.1
[58] Field of Search ........................ 455/2, 5.1, 6, 186.1, 455/186.2, 68, 70, 185.1; 348/468, 563, 10, 12, 906; H04N 7/10

[56] References Cited

U.S. PATENT DOCUMENTS

| | | | |
|---|---|---|---|
| 4,591,906 | 5/1986 | Morales-Garza et al. | 358/84 |
| 4,706,121 | 11/1987 | Young | 358/142 |
| 4,751,578 | 6/1988 | Reiter et al. | 358/183 |
| 4,977,455 | 12/1990 | Young | 358/142 |
| 5,047,867 | 9/1991 | Strubbe et al. | 358/335 |
| 5,093,718 | 3/1992 | Hoarty et al. | 358/84 |
| 5,101,267 | 3/1992 | Morales-Garza | 358/84 |
| 5,119,188 | 6/1992 | McCalley et al. | 358/86 |
| 5,132,992 | 7/1992 | Yurt et al. | 375/122 |
| 5,223,924 | 6/1993 | Strubbe | 358/86 |
| 5,393,713 | 2/1995 | Schwob | 455/186.1 |

OTHER PUBLICATIONS

Insight Telecast, Inc., Section I, pp. 1–12.
Stanfill et al., "Parallel Free–Text Search On The Connection Machine System" Communication of the ACM, vol. 29, No. 12, pp. 1229–1239, Dec. 1986.
Aalbersberg, "Incremental Relevance Feedback", Proceedings of the Fifteenth Annual International ACM SIGIR Conference on Research and Development in Information Retrieval, Jun. 21–24, 1992.

*Primary Examiner*—Reinhard J. Eisenzopf
*Assistant Examiner*—Philip J. Sobutka
*Attorney, Agent, or Firm*—Michael E. Marion

[57] ABSTRACT

A system comprising a user interface which can access downloaded electronic programs (e.g. pay per view movies) and information records related to said programs, which can be continually updated and provided over cable or satellite transmission paths or other "fast data" paths, and which can automatically correlate the program information with the preferences of the user, to create and display at least one personalized information database based upon the results of the correlation.

5 Claims, 4 Drawing Sheets

SYSTEM AND METHOD FOR FINDING A MOVIE OF INTEREST IN A LARGE MOVIE DATABASE

This application is a continuation in part of U.S. Ser. No. 08/070,130, filed on Jun. 1, 1993, which itself is a continuation in part of Ser. No. 889,201, filed May 27, 1992 which issued as U.S. Pat. No. 5,223,924 on Jun. 29, 1993, which are both incorporated by reference herein.

BACKGROUND OF THE INVENTION

U.S. Pat. No. 5,223,924 relates to an improved television interface system which accesses a downloaded TV program information database, which can be continually updated, and which is provided either "over the air", over cable or satellite transmission, or other "fast data" path, and which automatically correlates the information provided thereby with the preferences of the user, to create at least one further program information database based upon the results of the correlation. The parent application relates to a method and apparatus which utilizes aspects of the correlation methodology, to determine the electronic shopping preferences of a user.

The instant application applies the above mentioned correlation techniques to the task of aiding the user in selecting a movie from a large database, for example a "video on demand" type on-line movie system.

U.S. Pat. No. 5,047,867 describes an interface for a TV-VCR system which enabled the user to enter information concerning the user's favorite television programs as well as information about programs stored on video tape. Such information can include program name, broadcast channel, starting time, length, repeat pattern and whether the user wanted the program recorded. The patent further describes an interface system in which such information could be provided in an intuitive and easy manner through the television receiver's PIP display. The teachings of this patent are incorporated by reference herein.

Television systems utilizing downloadable information databases have been described, for example, by Insight Telecast, Inc. and in U.S. Pat. Nos. 4,751,578; 4,706,121 and 4,977,455, which are incorporated by reference herein. Using these systems, TV program information can be downloaded and stored in a memory and used by a processor to control a programmable TV tuner. U.S. Pat. No. 5,093,718 describes a system which can provide such information, including graphics and interactive options, over a "fast data" path which can be a cable, fiber optic or satellite system. Interactive, or "two way" television systems permitting viewer responses to video programming, are described for example, in U.S. Pat. Nos. 5,101,267 and 4,591,906, which are incorporated by reference herein. Integrated data services networks (IDSN) and bi-directional cable systems can also provide this interactivity and have been extensively discussed in the literature. These references are incorporated by reference herein.

In the December, 1986 issue of "Communications of the ACM" (Vol. 29, No. 12, pp. 1229–1239), in an article by Stanfill and Kahle entitled "Parallel Free-Text Search On The Connection Machine System", the method known as "free text search" is described in the article which details one method in which seed words are located which can be used to correlate information provided in one or more portions of text. Another paper entitled "Incremental Relevance Feedback" by Aalbersberg, which was published in the Proceedings of the Fifteenth Annual International ACM SIGIR Conference on Research and Development in Information Retrieval, Jun. 21–24, 1992, describes the use of "free text" search techniques in text information retrieval. The teachings of these articles are specifically incorporated by reference herein.

Pay-per-view movie selection/delivery systems are popular features of today's cable television systems. Most of these systems feature a limited choice of movies shown on a fixed schedule which can be viewed if requested and paid for by the viewer. Digital television technology, which permits rapid delivery of programming in compressed digital form, now makes it possible for cable, DBS, ISDN and "video dialtone" services to offer a much greater number of choices to the viewer on an "on demand" or "near on demand" basis. Such systems might offer hundreds of different movie titles in many different categories. The concept of "browsing" from among so many different possible choices is usually dealt with by nesting several different menus and thus, with time, aiding the viewer in choosing one movie from the many offered. Selection and ordering of a chosen movie with these new systems can therefore involve complicated menus and selection steps.

The object of the instant invention is to simplify this browsing and selection process.

SUMMARY OF THE INVENTION

In the near future viewers will be able to electronically "browse" through large databases in order to select a movie for immediate viewing over their cable, satellite, phone company, integrated data services network (ISDN) or other video dialtone systems. The particular movie selected via a return link to the system headend, is provided in digital form using multiplexed data transmission methods such as those described in U.S. Pat. Nos. 5,119,188 and 5,132,992 which are incorporated by reference herein.

A feature of the instant invention is to utilize the correlation methodology described in the grandparent patent ('924) and parent application, to enable a viewer to select a movie from a large number of movies without having to go through numerous nested levels of menu choices. The invention provides iteratively a first list of program titles likely to be desired by the viewer. The viewer provides feedback on each of the initial titles presented so that in accordance with the invention, the system can provide the viewer with a second list which matches his preferences even better than the first list. This process is repeated providing subsequent, and more directed, lists of program titles to the viewer and ends when the viewer selects a title to watch.

A preferred embodiment of the invention comprises an interface system which can be used with an interactive television transmission system carrying, along with television programming, an updatable entertainment database containing a large number of offered movies, television or other audio and/or visual program category choices. The selection categories can comprise, for example, title of the selection, featured stars, type of program (i.e. comedy, drama, mystery, science-fiction, musical, adult, etc.), plot summary, critical review, and still or moving audio and or video clips from the selection.

The interface system comprises a processor which utilizes "free text" search techniques well known to those skilled in the programming art, such as those taught in the references incorporated herein.

A preferred embodiment of the invention comprises a system and method which also comprises means for controlling the audio/video selection, retrieving and display of selection information as part of the television display (for example using an overlay or PIP function).

DETAILED DESCRIPTION OF A PREFERRED EMBODIMENT OF THE INVENTION

The embodiment of the invention described herein provides many of the features first described in U.S. Pat. No. 5,047,867 which is owned by the assignee of the instant application and which has common inventorship with the instant application. The '867 patent describes the manner in which portions of memory can be used to store various categories of programming information. For example, a first memory portion can store, in the form of a database, information related to future television programs, as well as information concerning those programs which are preferred by the user. By accessing this database, the user can display "Future Programs" as well as "Favorite Broadcast Programs" using a system of advanced menus and displays incorporating PIP, and an expanded channel ring. The techniques for providing information from specific databases to the user, described in the '867 application can be readily adapted to the display requirements of the instant invention and are incorporated by reference herein.

Figure 1:
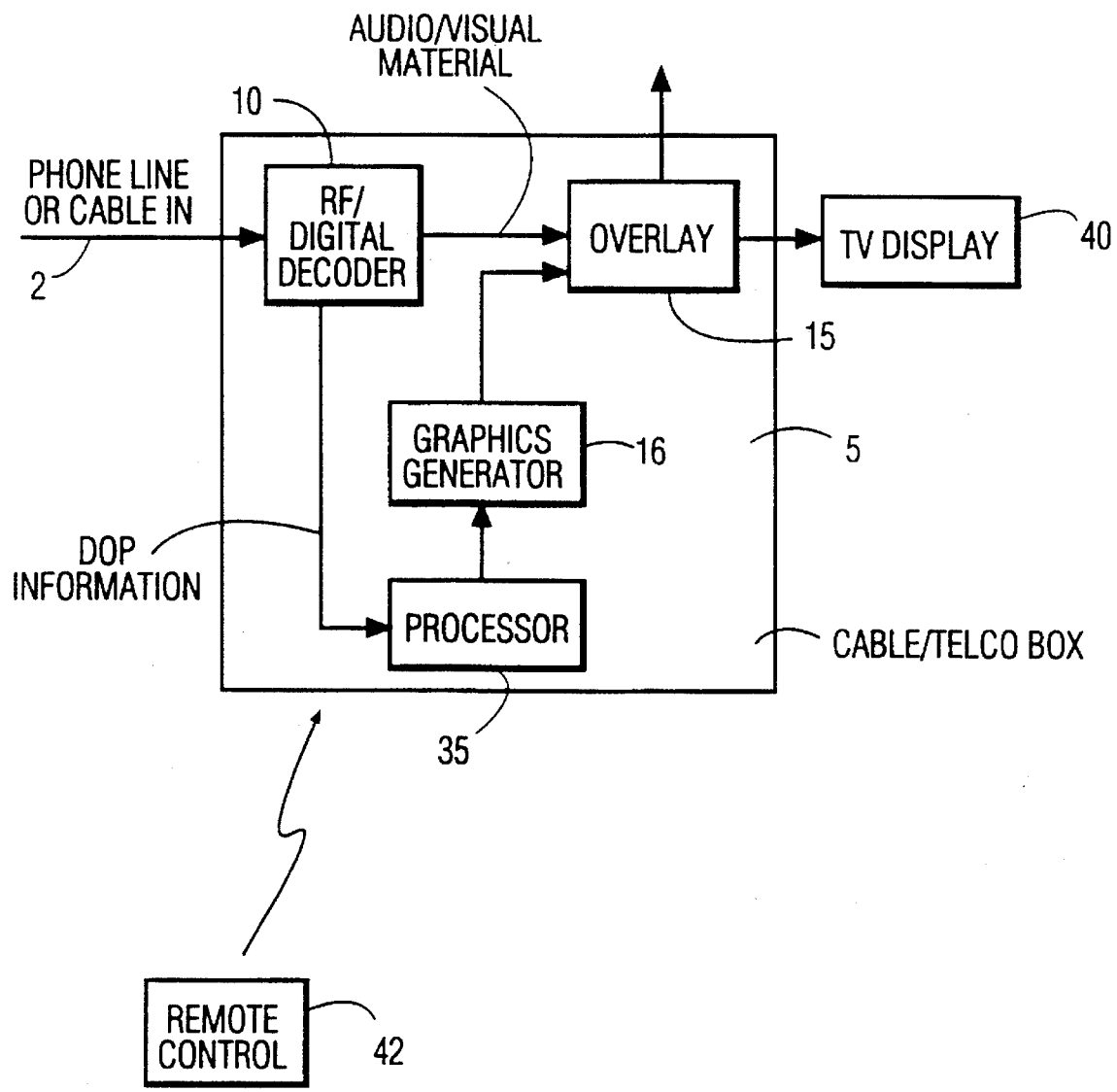
FIG. 1 is a block diagram of a system comprising a preferred embodiment of the invention.

FIG. 1 describes in block diagram form, a preferred embodiment of the invention. In this embodiment, it is assumed that a large database containing a list of programming selections (e.g. pay-per view movie selections) is available to the viewer via his cable, DBS, Telco, ISDN or other online program delivery service. The database comprising this list of titles and other descriptive information about the programming selections will be referred to hereinafter as "DOP" (descriptions of programming). The database which includes both the listing of available movies as well as the movies themselves are provided, for example, via a digital transmission system which carries compressed audio/video programming data (for example in using the MPEG and MUSICAM formats). This information can be updated periodically.

The arrangement described in FIG. 1, is for example only and it should be understood that the various block elements can be separate, or integrated into larger apparatus as shown, and still be within the province of the invention. The DOP is provided in digital form at input 2. This data can be provided as an RF signal either "over the air" or by one way or interactive (two way) cable, fiber optic, satellite, telco or other appropriate means of delivery for such information. For purposes of this description, we will assume that the digital data is provided by a wideband or "fast digital" data channel thereby permitting DOP which can include text and pictorial information related to movies and other programming selections offered to the viewer.

In the embodiment of the invention shown, a cable or phone company (telco) interface 5 is used in conjunction with a television receiver/display 40. The interface 5 comprises a processor 35, an RF/digital decoder 10, a graphics generator 16 and an overlay circuit 15 which allows a combined display of the A/V material as provided by RF/digital decoder 10 and DOP text information. Such circuits are known to those skilled in the art and may be replaced by PIP circuitry and/or be switchably connected in the interface 5 so that the viewer could choose to view only the A/V material or the DOP information. The DOP information can include preview "clips" as well as information which can be used with graphics generator 16.

Remote control 42 is used by the viewer to control the interface 5 and television receiver/display 40 in the known fashion, and also provides input keys with which the viewer can indicate "liked" or "disliked" items of the DOP during the browsing mode described below, and can choose the input to television receiver/display 40 to show only A/V material, only DOP information, or program material "overlayed" with the DOP graphics from graphics generator 16 or DOP information presented as a PIP display.

Decoder 10 functions to demodulate and decode or otherwise process the A/V material and DOP information, as described in more detail below. Decoder 10, separates the DOP information provided by the RF signal input 2 from the A/V material and provides the DOP data to processor 35. The A/V material from decoder 10 can be passed directly to receiver/display 40 or, as shown, via the switchable overlay unit 15. Although not shown, the overlay unit 15 could be replaced by a PIP display generator (as described in the parent application). The DOP data is processed by processor 35, as described in detail below, in conjunction with graphics generator 35, to provide a text output which can be combined with the A/V material in receiver/display 40.

Figure 2:
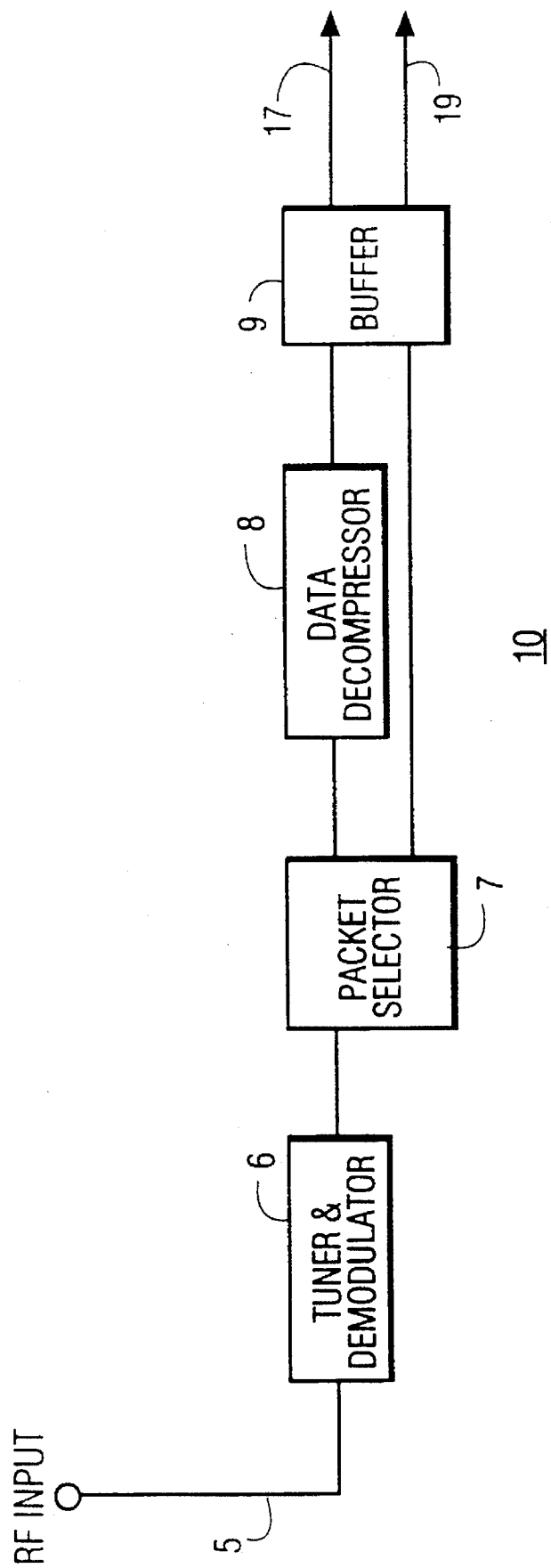
FIG. 2 is a block diagram describing one of the RF decoders shown in FIG. 1.

FIG. 2 is a more detailed block diagram of RF/digital decoder 10. In a fast data channel, data including the DOP can be provided in the form of packets comprising A/V data in compressed form. The DOP can comprise audio and full motion video display of "clips" of each offered program selection, as well as text summary descriptions of each selection which would comprise information about the plot, featured stars, category (comedy, drama, musical etc.) and critic's review information.

The RF signal upon which the digital data is modulated, for example, is provided to tuner and demodulator 6 which demodulates and separates the packets. Packet selector 7, separates the A/V material packets from the DOP packets, using techniques well known in the digital signal processing art, and provides the compressed program data packets to data decompressor 8 and DOP data packets to buffer 9. Decompressor 8 decompresses the program data to provide audio and video television programming via buffer 9, to overlay circuit 15. It should be stated here that although the program data is presented in this example as being digital in form, it could also be analog information, thus eliminating the need for the packet selector (except to separate the DOP packets) and the data compressor. If the DOP information contains any compressed image data, another data decompressor could be used to process that data.

Figure 3:
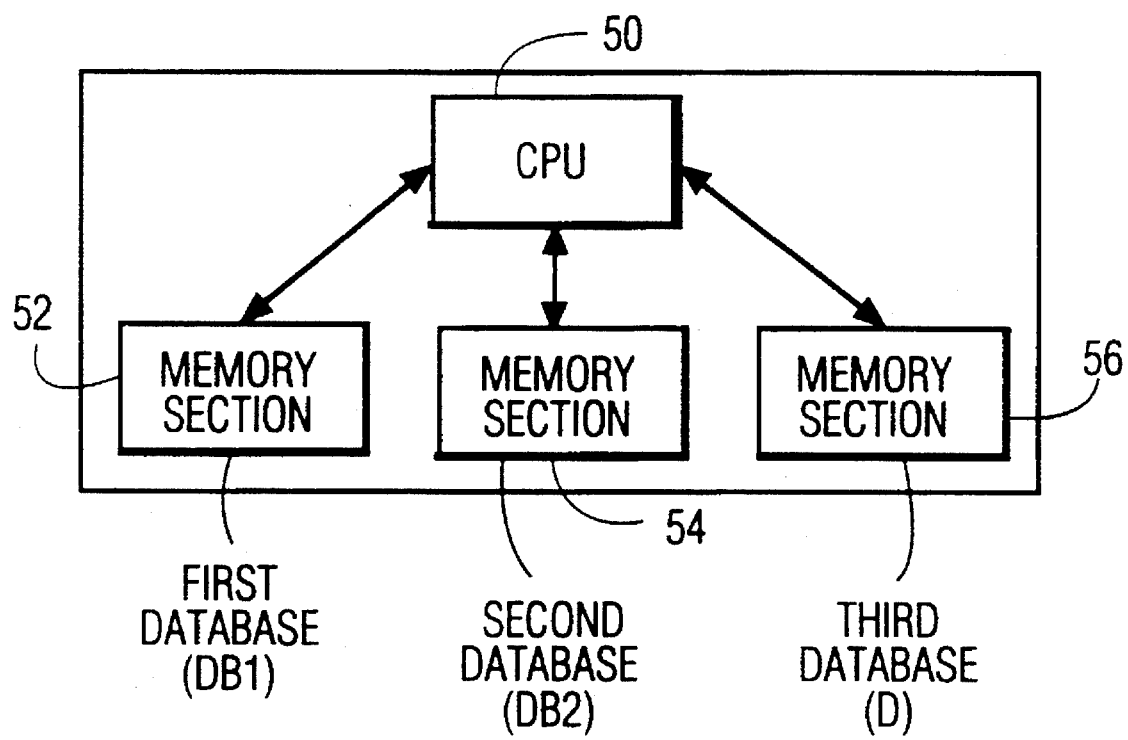
FIG. 3 is a block diagram of the processor shown in FIG. 1.

Processor 35 is shown in more detail in FIG. 3. It comprises a CPU 50, programmed to perform memory addressing functions necessary to set up and control read/write instructions to volatile memory configured into three sections, to contain respectively a first database 52, a second database 54 and a third database 56. CPU 50 also is programmed to accept positive and negative feedback from the viewer via remote control 42, and use this feedback in conjunction with one or more of the databases 52, 54, and 56, as described below. In addition, CPU 50 is programmed to perform "free text" search operations as described, for example, in the references incorporated herein, on one or more of the databases 52, 54 or 56.

Database 52 is used to store the DOP data downloaded from, and periodically updated by, the headend of the online programming service. In other words, the DOP data for all (or a preselected group) of the available "on demand" programs is provided to database 52 (hereinafter referred to as DB1). Database 54 is used to store records selected from those stored in DB1 which are indicated as "liked" by the user or "disliked" by the user. In a simplified embodiment, the viewer make only one judgment about a particular DOP selection. In a more complex embodiment the user would be able to specifically indicate more than one opinion about what is "liked" or "disliked" about the DOP selection, for example by moving a viewer controlled cursor to the name of an actor or director or to a keyword in the DOP data before pressing the "like" or "dislike" button.

The '867 patent describes the use of an expanded channel ring and display system to allow a user to browse through a group of records. These techniques can also be used in conjunction with the databases 52, 54 and 56, to display the information stored therein.

Figure 4:
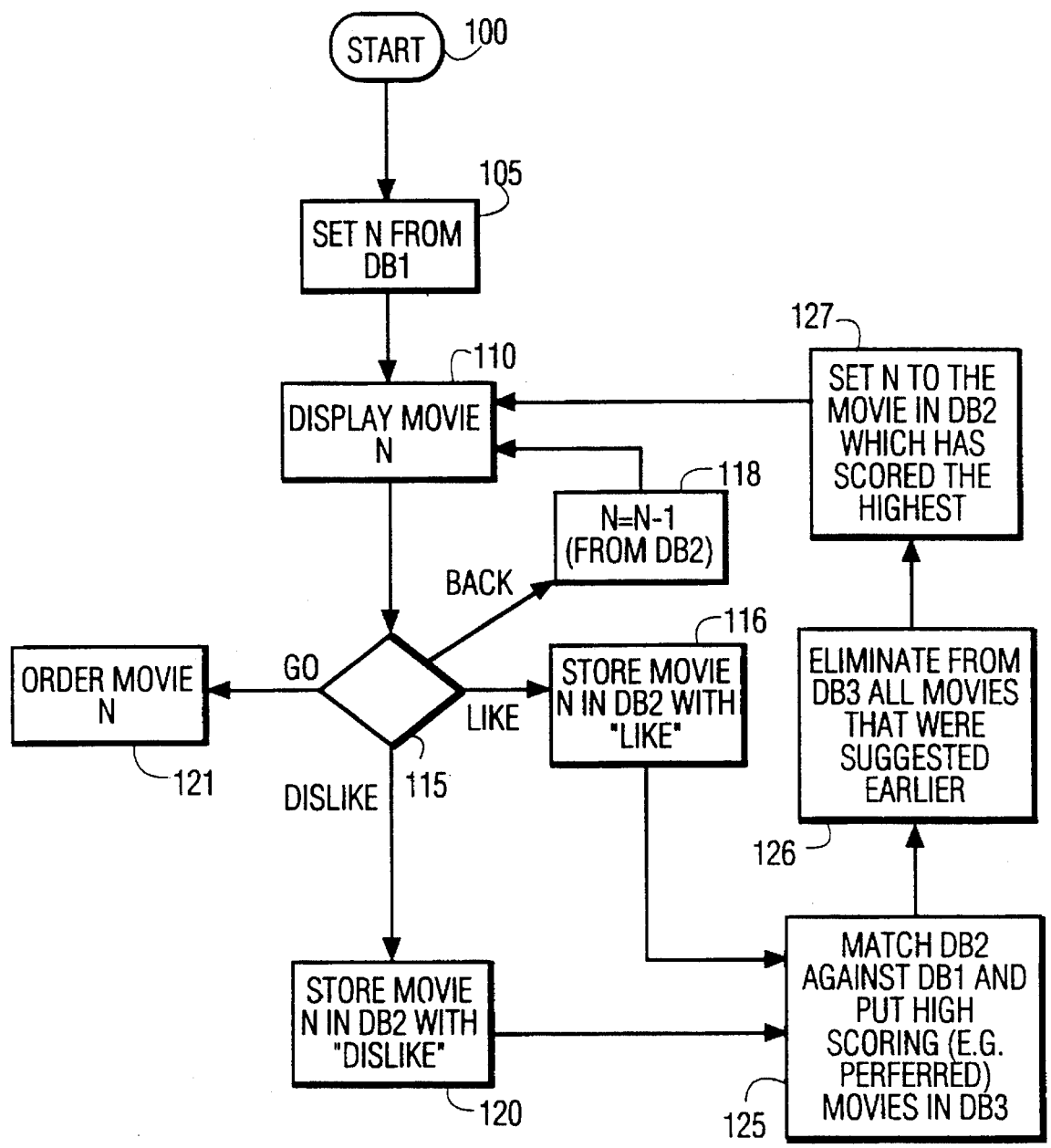
FIG. 4 is a flow diagram illustrating viewer directed automatic browsing.

FIG. 4 is a flow chart which describes the browsing/selection process. The "liked" or "disliked" indications can be made in several ways. The browsing sequence begins 100 when the viewer presses a "start" or "movie" button on remote control 42 which directs CPU 50 to begin addressing the DB1 (i.e. memory section 52).

In a manner similar to the display processes described in the '867 patent, the DOP information from DB1 for a current hit movie H is provided as record N 105 and the information, either in text, video "clip" and/or audio form, is displayed for review by the viewer 110. The overlay circuit 30 can also be controlled in known fashion by the viewer using remote control 42 and the chosen data record can be displayed as text or graphic information superimposed over the pictures provided by the A/V material provided by decoder 10. These modifications are to be understood as variations of the invention as described herein.

Upon viewing the DOP record N, the viewer can then register whether or not he "likes" or "dislikes" the displayed selection 115. Although not shown, it is to be understood that remote control 42 can have "like" and "dislike" buttons. The other buttons of the remote control 42 could be programmed to register "like" and "dislike" as well, for example choosing "channel up" in response to a particular selection could register "dislike". Known systems exist for use with such systems to select "pay per view" movies and can easily be adapted to use as a mechanism for indicating an item for purchase.

By inputting a "like" responses a flag is set in the record N and then stored, along with that record, in memory section 54 (hereinafter referred to as DB2) 116. A negative response by the viewer can similarly be made by pressing a button on the remote control 42 marked "dislike" which would set a corresponding flag in the record which is stored with the record N in DB2 120. The viewer can see a selection on which he has previously given his opinion by pressing "back" 118.

After registering "like" or "dislike" for record N=H, the processor 35 correlates DB2 with DB1 125 in order to create a third database stored in memory 56 (hereinafter referred to as "DB3") which represents a personalized information database made up of only those selections from DB1 which strongly correlate to "liked" and "disliked" records stored in DB2.

In the correlation step 125, the DOP information field containing the text summary of each record stored in DB2 is analyzed in accordance with the "free text" search techniques described and the references incorporated herein. This text summary would typically describe details about the corresponding program selection such as category (e.g. drama, comedy, musical), featured stars, plot summary, etc. Unimportant words like "a", "the" etc are removed The remaining words are reduced to their stems (i.e. prefixes and suffixes are removed). Each stem in each "liked" record is given a positive weight. Each stem in each "disliked" record, which is not simultaneously a stem in a "liked" record is given a negative weight. With these stems and weights a "simple query" is performed over all of the DOP data records in DB1, i.e. the downloaded DOP database.

In the "simple query" every record in DB1 is scored (for potential retrieval value) by adding up the weights for the word stems it contains. The total score is then normalized with respect to the length of the respective text record. Additional techniques can be used to speed up this query, in particular, the "surrogate coding" described in the Stanfill & Kahle reference incorporated herein. Different weight values could also be assigned for different types of viewer "like" inputs. Those records are sorted according to their respective retrieval values (i.e. weights) and are stored in order according to retrieval value (highest values are first).

After duplicate records stored in DB3 are removed 126, N is set to the record in DB3 having the highest score and offered as the next selection to the viewer 127, 110. DB3 represents an iteratively generated personalized version of the downloaded DOP database DB1 which is continually updated via steps 115 to 127, until a selection is chosen for viewing 121.

As described in FIG. 4, only the highest scoring DOP record is presented to the viewer for judgment. The system could be made more complex by presenting several of the highest scoring selections to the user for judgment. Keywords of each of the DOP records could also be judged by the viewer.

DB2 represents a "mood profile" which represents a highly up to date interest profile of the viewer. Rather than describing the viewer's general interests, DB2 represents the viewer's programming preference during the current program selection process. This preference is highly dependent on his current mood. For example, although the viewer might in general like science fiction movies, at any given time he might be in the mood for a comedy. By indicating "liked" for several offered comedy selections during a particular browsing session, his "mood profile", as reflected in DB2, would be dominated by comedy selections. Thus, the invention provides a method for allowing the user to correlate his or her preferences, in an automatic fashion using, for example, "free text" searching techniques, in order to generate iteratively a personalized DOP database from which to choose a program selection.

The invention avoids the use of a complicated network of nested menus by correlating all of the possible program selections with the "past history" of preferences previously registered by the viewer and stored in DB2, and offering to the viewer ONLY those which correlate with those preferences.

The compilation of DB2 (the "mood profile") terminates when a programming selection is chosen for viewing. DB2 is cleared and reset each time a browsing session is started.

In case of a two-way interactive system (e.g. two-way cable, telephone system, etc.) the processor and databases of FIG. 3 can be located at the headend (cable company or telephone company), or be distributed between the headend and the TV set.

While the invention has been described in its preferred embodiment, it is to be understood that the words which have been used are words of description rather than of limitation and that changes within the purview of the appended claims may be made without departing from the true scope and spirit of the invention in its broader aspects.

We claim:

1. A method for providing a personalized entertainment program database for use with a program selection systems, wherein said system provides an electronic information database comprising a plurality of summary records from which a user can make a choice, said method comprising the steps of:

a) receiving and storing said summary records;
   b) displaying a selected record from said summary records;
   c) indicating preference or dislike for said selected record;
   d) storing said selected record with its indicated preference or dislike;
   e) deriving first search information from said selected record;
   f) correlating said first search information with each of said summary records so as to select second selected records from said summary records;
   g) storing said second selected records so as to form a personalized information database;
   h) displaying a further selected record from said personalized information database; and
   i) repeating steps c) through h) until said displayed selected record is chosen by the user.

2. The method of claim 1 wherein said correlating step is a free-text search.

3. An apparatus for providing a personalized entertainment program database for use with a video on demand program ordering and delivery system from which a user can make a choice, said apparatus comprising:

first storage means for receiving and storing an electronic information database comprising a plurality of summary records provided by said system;
   means for displaying a selected record of said summary records;
   means for indicating preference or dislike for said selected record;
   second storage means for storing said selected record with its indicated preference or dislike;
   means for deriving first search information from said selected record;
   means for correlating said first search information with each of said summary records so as to select second selected records from said summary records; and
   third storage means for storing said second selected records so as to form said personalized information database.

4. The apparatus of claim 3 wherein said correlating means performs a free-text search.

5. The apparatus of claim 3 further comprising means for selecting a first of said second selected records and requesting an entertainment program corresponding to said first of said second selected records.

* * * * *